May 16, 1933.  H. FORD  1,908,744
BRAKE HOOK-UP
Filed Dec. 18, 1931   4 Sheets-Sheet 1
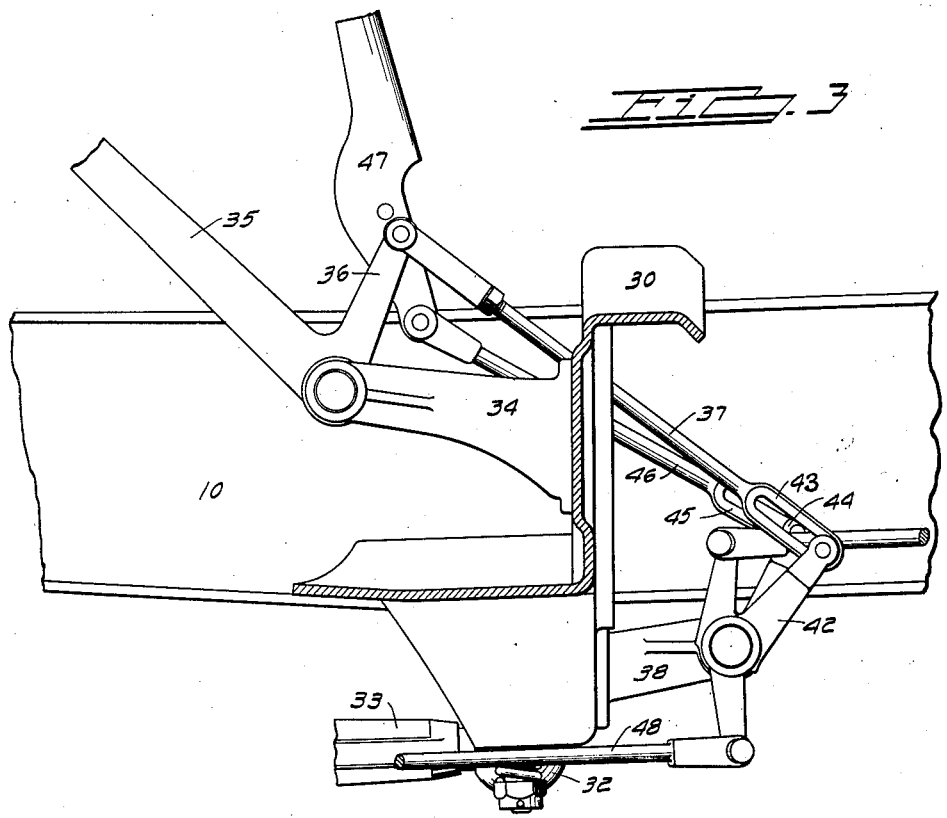
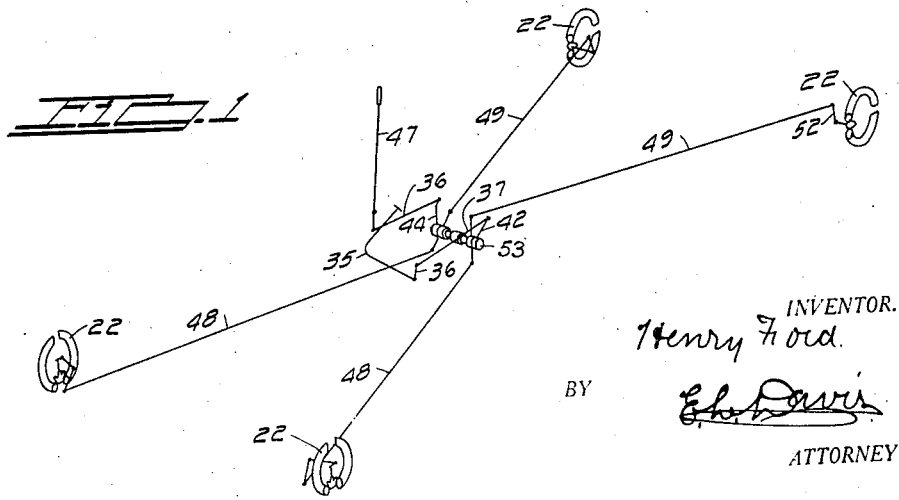
INVENTOR.
Henry Ford.
BY
ATTORNEY.

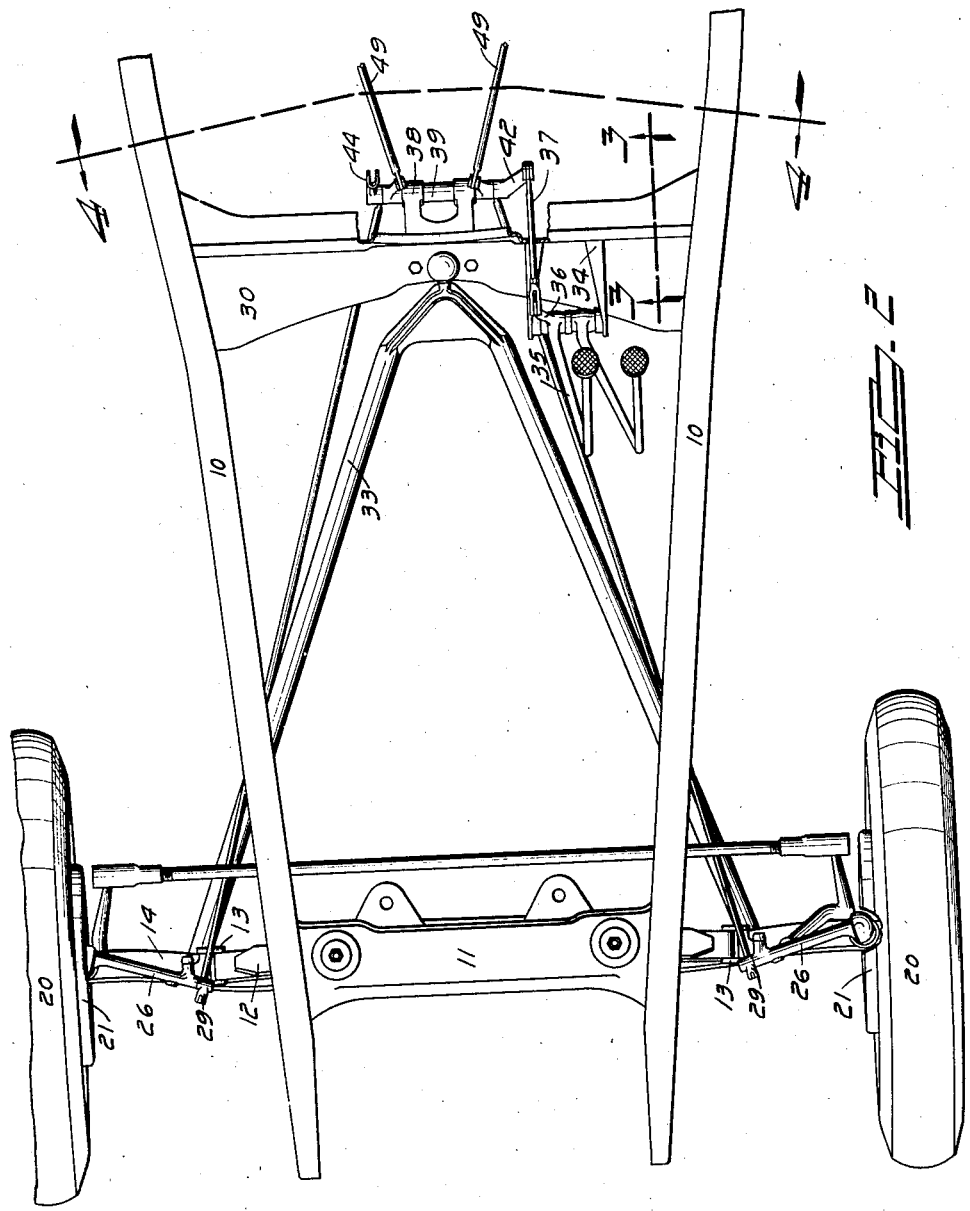

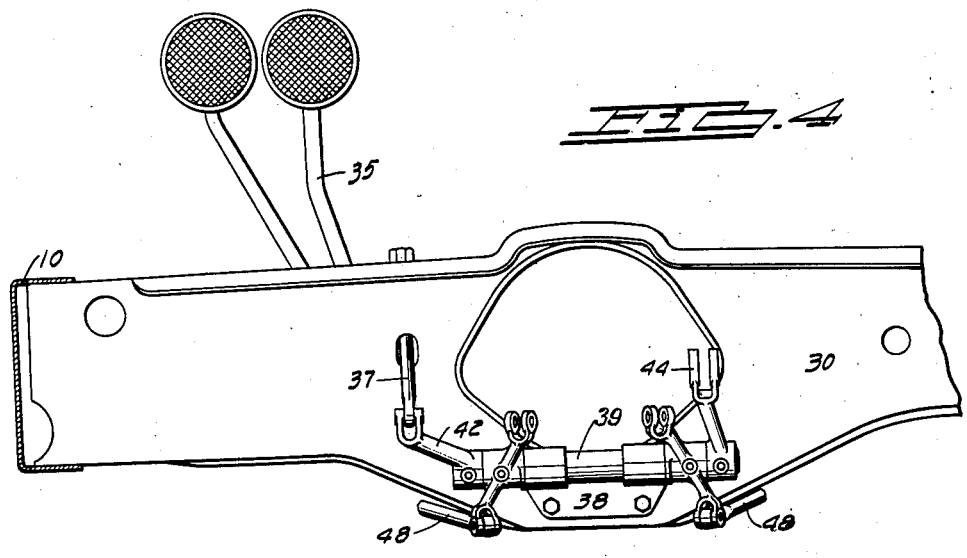
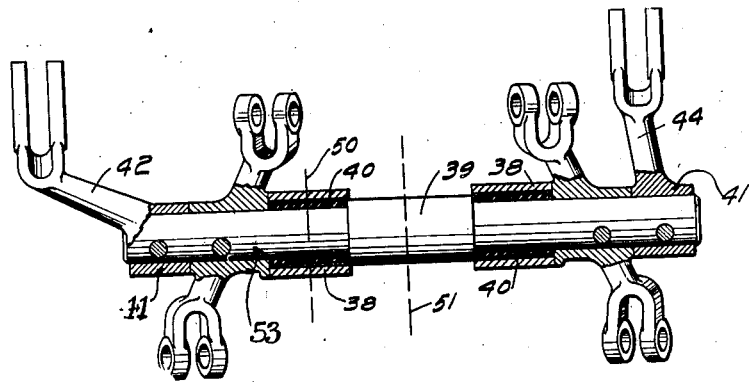

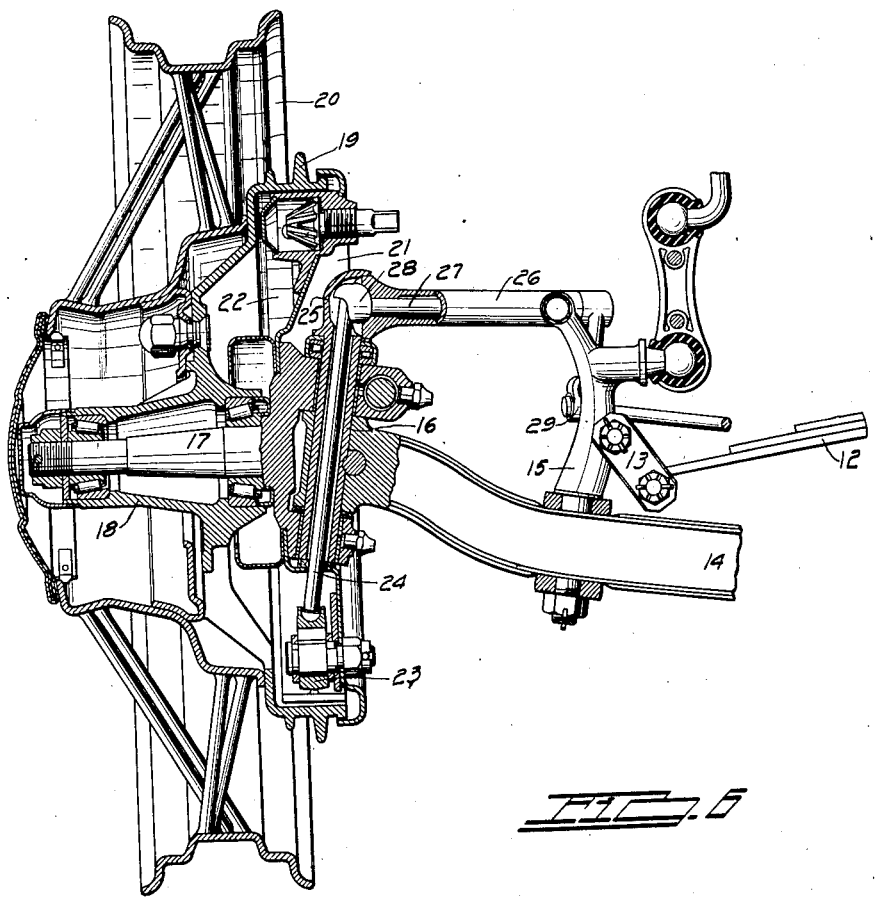

Patented May 16, 1933

1,908,744

UNITED STATES PATENT OFFICE

HENRY FORD, OF DEARBORN, MICHIGAN, ASSIGNOR TO FORD MOTOR COMPANY, OF DEARBORN, MICHIGAN, A CORPORATION OF DELAWARE

BRAKE HOOK-UP

Application filed December 18, 1931. Serial No. 581,879.

The object of my invention is to provide a brake hook-up of simple, durable and inexpensive construction.

A further object of my invention is to provide a brake hook-up for motor vehicles wherein a single brake is provided on each of the four vehicle wheels which four brakes are connected so that the same brakes may be used as either the service or the emergency brakes.

Still a further object of my invention is to provide a brake hook-up, as mentioned in the preceding paragraph, wherein even after the failure of any one part in the system at least two brakes will be available to stop the vehicle. By this arrangement I am able to provide the maximum braking reaction for both the emergency and service brakes and need only provide one brake on each wheel of the vehicle, while at the same time I am able to apply the brakes on at least two wheels even after any part of the hook-up or brakes fails to operate.

Up to this time it has been customary to provide four brakes, one on each vehicle wheel, which brakes were connected to a service brake pedal through suitable linkage so that the normal braking of the car was accomplished through all of the four wheels. To guard against possible failure of any one of the several brake applying rods or the loss of one of the clevis pins, either of which conditions would cause the system to fail, a separate pair of brakes were usually provided on the rear wheels of the vehicle which were connected to an emergency brake lever so that in case the service brakes failed to operate then the emergency brake might be actuated to apply the two independent rear-wheel brakes. When such construction was used the emergency brake lever could not adequately stop the car because it actuated the brakes on only the two rear wheels.

In contrast to this widely used structure, the applicant has provided a system wherein both the service and emergency brakes operate through the four vehicle wheels and which possess the same factor of safety, that is, the failure of either system will always leave the brakes on at least two wheels operative. The applicant accomplishes his superior results at a materially less cost than the former structure.

Of course, it is a relatively simple matter to provide brakes on each of the four wheels of a vehicle and then hook-up these brakes so that they may be applied by either a pedal or a lever. However, in all of the arrangements with which the applicant is familiar, it is possible that some one common part of the system might fail which would render both the emergency and service brakes inoperative. This contingency has been effectively prevented in a simple manner by the applicant's device, the structure accomplishing same forming one of the important features of this invention.

Still a further object of my invention is to provide a brake hook-up wherein a single relatively short brake cross shaft is provided at the center of the vehicle from which diagonal brake rods extend outwardly to the four wheels of the vehicle. The diagonal stress or pull at the forward end of these operating rods is transferred in a novel and efficient manner to apply the front wheel brakes whereby side thrust is eliminated.

With these and other objects in view my invention consists in the arrangement, construction and combination of the various parts of my improved device, as described in the specification, claimed in my claims and illustrated in the accompanying drawings, in which:

Figure 1 shows a diagrammatic view illustrating my improved brake hook-up.

Figure 2 shows a plan view of the front portion of a vehicle having one embodiment of my invention thereon.

Figure 3 shows a sectional view, taken on the line 3—3 of Figure 2.

Figure 4 shows a sectional view, taken on the line 4—4 of Figure 2.

Figure 5 shows an enlarged view of the center brake cross shaft, shown in Figure 4, illustrating the bearing construction used in mounting this shaft, and Figure 6 shows a vertical central sectional view through one of the front vehicle wheels, showing the brake applying mechanism.

Referring to the accompanying drawings, I have used the reference numeral 10 to indicate generally the side members of a vehicle frame having cross members 11 disposed between the ends thereof, which cross members are secured to the center portions of a pair of transverse springs 12 in the conventional manner with the outer ends of these springs secured in conventional spring shackles 13. A front axle 14 is disposed beneath the front transverse spring, and is provided with a pair of spring perches 15 extending upwardly therefrom and spaced from each end thereof, to which spring perches the shackles 13 are secured. Each outer end of the front axle 14 is vertically apertured to receive a hollow king-pin 16 to which a wheel spindle 17 is pivotally secured. A wheel hub 18 is rotatably mounted on the spindle 17 and a brake drum 19 and wheel 20 are secured to the hub member in the ordinary manner. A brake anchor plate 21 is secured to the spindle 17 and supports a pair of brake shoes 22 to form a conventional internal expanding brake which operates against the drum 19. In order to apply the shoes 22 to the drum a wedge 23 is reciprocally mounted on the anchor plate 21 in position between two adjacent ends the pair of brake shoes and a push rod 24 extends up through the hollow king-pin 16 whereby upon downward movement of the rod 24 the wedge 23 will be actuated to apply the brake shoes against the drum 19. The upper ends of the kingbolt is provided with a hollow head 25 and a tubular housing 26 extends between the upper end of the adjacent spring perch 15 and the head 25 to thereby form a closure for this head member. The housing 26 rotatably supports an operating rod 27 having a cam 28 on the end enclosed within the head 25, which cam bears against the upper end of the push rod 24 whereby a suitable arm 29 secured to the opposite end of the rod 27 may be actuated to thereby actuate the brake.

The above specific form of brake has been described merely to illustrate my preferred construction but it will be apparent that any type of brakes which actuate against the wheels of the vehicle may be used in connection with my hook-up without departing from the spirit of my invention. However, it will be noted from Figure 2 that the inner ends of the housings 26 are placed ahead of the king-pins, the purpose of which is to maintain the axes of the rods 27 perpendicular to the diagonally extending brake operating rods, subsequently to be described, thus effecting a direct pull on these operating rods.

The rear-wheel brakes of my vehicle have not been disclosed, as any one of the numerous conventional types of rear-wheel brakes may be used with my hook-up. However, it is preferable to provide brakes similar to the front brakes just described, with the exception that these brakes not being swivelly mounted, need only be provided with cams in place of the wedges 23 which cams are operated by suitable levers 52 pivotally secured directly in the brake anchor plates. Each of the brake applying arms 29 and 52 are so arranged that movement of their outer ends toward the center of the car will apply the brakes.

Extending across the center of the frame I have provided a central cross frame member 30, adequately secured to the side members 10 by corner braces 31 having on the central portion of its forward face a socket 32 whereby the joined ends of a pair of radius rods 33 are universally mounted, the outer ends of these rods extending forwardly to the spring perches 15 where they are secured to the front axle. A U-shaped bracket 34 is likewise secured to the forward face of the cross member 30 between the socket 32 and the frame member 10 which serves as a support for a pair of foot operated pedals. One of these pedals actuates the clutch and the other, numbered 35, actuates my brake. An arm 36 is forged integrally with the pedal 35 having its upper end slotted to form a clevis connection whereby a rod 37 is secured thereto, which rod 37 extends to position rearwardly of the cross member 30. Actuation of the pedal 35 thereby draws the rod 37 forwardly.

Referring now to Figures 4 and 5, it will be seen that I have provided a U-shaped bracket 38 which is riveted to the rear side of the cross member 30 and which is comprised of a pair of rearwardly extending arms, the outer ends of which are drilled to form a pair of aligned bearings in which a relatively short brake cross shaft 53 is mounted. The center portion 39 of the cross shaft 53 is formed of such diameter that it may be inserted through the apertured ends of the bracket 38, this center portion being substantially the same length as the space between the arms of the bracket 38. Those portions of the shaft 53 aligned with the openings in bracket 38 are of a reduced diameter so that oilless type bearings 40 may be inserted over these portions and pressed into the apertured ends of the bracket 38 to thereby rotatably mount the shaft in an improved manner. The outer ends of the shaft 53 project outwardly from each side of the bracket, each of these ends having a beam 41 non-rotatably secured thereon which beam normally lies in a substantially vertical plane. A service brake operating arm 42 secures to that end of the shaft adjacent to the pedal 35 which arm extends upwardly whereby it is clevised to the rear end of the rod 37. It will be seen from Figure 3, that the rear end of the rod 37 is formed with a head 43 having an elongated slot therein through which a conventional clevis pin extends whereby actuation of the pedal 35 will actuate the arm 42 but actuation of the arm 42 will not actuate the pedal.

The opposite end of the cross shaft 53 is provided with a second arm 44 extending upwardly therefrom which is in like manner provided with a clevised upper end portion to which a second elongated head 45 which is formed on the rear end of an emergency brake operating rod 46, is secured. The rod 46 extends forwardly where it is connected to the lower end of an emergency brake lever 47 whereby actuation of the lever 47 will oscillate the cross shaft 53. From the foregoing it will be seen that the cross shaft 53 may be selectively operated by either the pedal 35 or the lever 47 and that the operation of either of these members will not actuate the other member.

In order that the brake cross shaft 53 may operate the wheel brakes in the simplest, most efficient manner, a pair of front brake operating rods 48 are clevised to the lower end of the beams 41 and extend forwardly to the brake operating arms 29. It will be seen from the drawings that the clevised ends of the beams 41 are aligned with these diagonal rods so that direct tensional stress is applied to the rod by the actuation of the cross shaft. The upper ends of the beams 41 are likewise clevised to the forward ends of a pair of rear brake operating rods 49 each of these rods extending to the respective operating arms 52 on the pair of wheel brakes.

It may be thought that a uniform braking force on each of the four wheels cannot be obtained because of the lack of equalizers between the several wheels of the car, however, the applicant has found that when the brakes on each of the wheels are evenly adjusted, which is easily accomplished with the brakes shown, then these brakes invariably stay in an equalized condition.

Although the hook-up just described is extremely simple and should ordinarily require no attention during the life of the vehicle, it is still conceivable that one of the clevis pins, threaded connections, or pins whereby the arms are secured to their respective shafts, might become loose or shear to thereby render the brakes inoperative. It is not essential under such a remote possibility that all of the four brakes necessarily function but it is essential that at all times at least two of the wheels of the car will be provided with brakes even after the failure of any one part of the system. It is assumed, of course, that the weakest part of the system will fail first and that when the driver discovers that only two of his brakes are operating he will have the defective part replaced to thereby bring his brakes up to the normal condition. It is also assumed that only one part will fail at a given time inasmuch as such failures are invariably caused by some part shaking loose so that the simultaneous failure of two parts of the brake hook-up is of such a remote possibility as to be of no consequence.

It may be well to point out the results of the failure of the several parts of this hook-up. It will be seen from the accompanying drawings that failure of either the pedal 35, rod 37 or arm 42 will cause only the service pedal to become inoperative but will not in any way affect the operation of the emergency brake. Inversely, failure of the emergency brake lever, rod 46 or arm 44 will likewise leave the service brake pedal operative. In either of these cases the actuating device remaining effective will operate on the four wheels of the car.

There is also the possibility that either of the beams 41 will become loose from the cross shaft 53, in which case the actuation of either the pedal or emergency brake lever will still actuate the front and rear-wheel brakes on one side of the car. Inasmuch as there is no equalizer disposed between the brakes from side to side, it will be seen that the brakes on each side of the car may be applied independently.

It is, of course, apparent that the failure of any one of the rods 48 or 49 would effect only the operation of its particular wheel brake and would not in any way hinder the operation of the other three brakes. The only remaining element in this brake hook-up is the cross shaft 53 which might be defective and twist off at any point throughout its length. If the shaft should fail between either of the arms 42 or 44 and one of the beams 41 it would then leave the opposite arm free to apply the four brakes, while if the failure occurred at one of the bearings, shown by the dotted line 50, then that side of the brake system would be affected but the two brakes on the opposite side would still be operable. If now the break occurred at the center of the shaft 39, shown by dotted line 51, then actuation of the pedal of the car would apply the brakes on one side of the vehicle, while actuation of the emergency brake lever would apply the two brakes on the opposite side.

From the foregoing it will be seen that the failure of any part of the system will still leave two brakes operative. This feature is in part attributable to the enlarged cross section at the center of the cross shaft 53 for the reason that if the shaft 53 was of uniform cross section throughout its length, as is ordinarily the custom, and the failure occurred between the beams 41 then each end of the shaft would pull out of the bearings 40 so as to render all of the brakes inoperative. However, with the enlarged portion of the shaft 53 between the two bearings such a possibility is removed, as the shaft would have to break at two places simultaneously to allow it to pull out from between the bearings 40. It is, of course, impossible to stress a shaft so as to break it at two places at the same time so that it may be concluded that the failure of any part of this entire system will render only two of the brakes inoperative.

The advantages gained by the use of this construction are due to its simplicity and cheapness to manufacture together with its positive operation of the brakes under all conditions.

Some changes may be made in the arrangement, construction and combination of the various parts of my improved device without departing from the spirit of my invention, and it is my intention to cover by my claim such changes as may reasonably be included within the scope thereof.

I claim as my invention:

1. A brake hook-up for use in connection with a vehicle having a brake on each of its four wheels, comprising a brake cross shaft rotatably mounted at the center of the vehicle by means of a pair of spaced bearings, an arm fixedly secured to one end of said shaft having operative means connecting it with a service brake pedal, a second arm fixedly secured to the opposite end of said shaft having operative means connecting it with an emergency brake pedal, and beams fixedly secured to said shaft and operatively connected with the brakes on the four vehicle wheels, whereby oscillation of said shaft will apply all four of said brakes, said shaft having an enlarged portion disposed between said bearings preventing axial movement thereof for the purpose described.

2. A device, as claimed in claim 1, having a slip connection between both the service brake pedal and its operated arm and between the emergency brake lever and its operated arm, whereby actuation of either said pedal or lever will allow the other to remain in its inoperative position.

3. A brake hook-up for use in connection with a vehicle having a brake on each of its four wheels comprising a bracket having a pair of transversely spaced arms extending therefrom in the outer ends of which a brake cross shaft is rotatably mounted, means on said shaft disposed between said arms preventing axial movement thereof, vertical beams secured to said shaft having rods extending therefrom to the brakes on each of the four wheels whereby oscillation of said shaft will apply all of said brakes, and a pair of manually operable controls arranged to selectively oscillate the respective ends of said shaft.

4. A brake hook-up for use in connection with a vehicle having a brake on each of its four wheels, comprising a bracket secured to the vehicle frame having a pair of spaced bearings therein whereby a brake cross shaft is rotatably mounted on the vehicle, means on said brake cross shaft disposed between said bearings whereby axial movement of the shaft is prevented, a pair of beams fixedly secured to said shaft one on each side of said bearings having rods extending therefrom to the brakes on each of the four vehicle wheels whereby oscillation of said shaft will apply all of said brakes, and a pair of manually operable controls arranged to selectively oscillate the respective ends of said shaft.

5. A brake hook-up for use in connection with a vehicle having a brake on each of its four wheels comprising a U-shaped bracket secured to the center cross member of the vehicle having each of its arms apertured to transversely rotatably mount a relatively short brake cross shaft, means at the center of said cross shaft whereby axial movement of said shaft in said bracket is prevented, a pair of beams non-rotatably secured to said shaft on each side of said bracket, a pair of brake rods extending from the front brakes of said vehicle to the lower end of said beams, a second pair of brake rods extending from the rear wheels of the vehicle to the upper ends of said beams whereby oscillation of said shaft will apply all of the four vehicle brakes, and a pair of manually operable controls arranged to selectively actuate said shaft from positions on each side of said bracket for the purpose described.

6. A brake hook-up for use in connection with a vehicle having a brake on each of its four wheels, comprising a brake cross shaft having its intermediate portion rotatably mounted on the vehicle by means of a pair of spaced bearings, the portion of said shaft between said bearings being enlarged to thereby prevent axial movement of the shaft, a pair of beams non-rotatably secured in a vertical position to said shaft, the lower ends of said beams being connected to the brakes on the front wheels of the vehicle and the upper ends of said beams being connected to the brakes on the rear wheels of the vehicle, and a pair of manual brake applying members arranged to selectively oscillate said shaft from positions on each side of said bracket.

7. A brake hook-up for use in connection with a vehicle having a brake on each of its four wheels, comprising a brake cross shaft rotatably mounted on the vehicle frame by means of a pair of spaced bearings, said shaft having an enlarged portion between said bearings preventing axial movement thereof, arms extending from said shaft suitably connected with the brakes on the respective wheels of the vehicle whereby oscillation of said shaft will positively apply all of the four brakes, a foot pedal arranged to oscillate said shaft by applying a rotary force at one end thereof, and a hand lever arranged to oscillate said shaft by applying a rotary force at the other end thereof.

8. A brake hook-up for use in connection with a vehicle having a brake on each of its four wheels, comprising a U-shaped bracket secured to the rear face of a center cross member of the vehicle frame, the outer ends of said U-shaped bracket being apertured to provide a pair of spaced bearings, a brake cross shaft rotatably mounted in said bearings having an enlarged center portion whereby axial movement of said shaft through said bearings is prevented, beams non-rotatably secured to said shaft one on each side of said bracket, rods extending from the lower ends of said beams to the front wheel brakes of the vehicle, rods extending from the upper ends of said beams to the rear wheel brakes of the vehicle, a foot actuated brake pedal connected through a slip joint with one end of said cross shaft whereby actuation of the foot pedal will oscillate said shaft to thereby apply all of the brakes and a hand lever connected through a second slip joint with the opposite end of said shaft whereby actuation of this lever will apply all of the brakes independently of said pedal.

9. A brake hook-up for vehicles comprising a brake rod extending diagonally from the center of the vehicle to one of the wheels thereof, a brake on said wheel, means associated with the center of the vehicle connected to the adjacent end of said rod, an operating shaft rotatably mounted upon the vehicle axle adjacent to said brake, the axis of said shaft being substantially perpendicular to the axis of said rod, an arm extending radially from the inner end of said shaft which arm is connected to the free end of said rod whereby axial reciprocation of said rod will transmit a rotating stress in said shaft and will not tend to move said shaft axially nor bend said rod, and a connection between the outer end of said shaft and said brake, whereby rotation of said shaft will apply said brake.

10. A device, as claimed in claim 9, wherein a pair of rods are provided each of which extend diagonally from the center of the vehicle to the respective front vehicle wheels, and wherein the forward ends of each of these rods are connected to a pair of brake-operating shafts each of which shafts is rotatably mounted substantially perpendicular to its adjacent operating rod, for the purpose described.

HENRY FORD.